2,761,805

SYNERGISTIC INSECTICIDAL COMPOSITIONS OF BENZENE HEXACHLORIDE AND A TERPENE HYDROCARBON

Pedro Marron Huidobro and Juan Nebrera Escobar, Madrid, Spain

No Drawing. Application December 15, 1952, Serial No. 326,128

Claims priority, application Spain October 9, 1952

3 Claims. (Cl. 167—30)

The present invention relates to a new insecticidal agent and a process for its preparation. The new insecticidally active agent may be utilized in the preparation of very efficient and persistent, solid and liquid insecticides.

A new active material may be constituted by the combination of benzene hexachloride $C_6H_6Cl_6$, with terpene hydrocarbons of the formula $C_{10}H_{16}$, which are derivatives of the essence of turpentine, the terpene hydrocarbons being prepared in the manner as set forth below and constituting the activating ingredient for the chlorinated insecticide.

The terpene hydrocarbons are prepared in accordance with the invention by treating the essence of turpentine (density 0.856–0.870) with from about 3 to 8% $H_2SO_4$ at temperatures below 0° C., separating the tars and other impurities, and neutralizing the acidified hydrocarbon with an appropriate amount of alkali. These terpene hydrocarbons consist substantially of a mixture of alpha pinene and polymerized alpha pinene.

The activating terpene ingredient and a chlorinated insecticide may be absorbed onto a solid and used in the solid state by adding it to inert substances, such as talc, kaolin, bentonite, etc., and may be used in agriculture, for the destruction of rodent and sucking insects.

When in its liquid state, it may be applied to moisten inert solid substances, thereby achieving the same purposes, or an insecticide and the activating ingredient may be dissolved in appropriate solvents, and may be used in spraying appliances for which the liquid insecticide is destined.

A mixture of chlorinated insecticide and the activating ingredient may be obtained by adding the activating ingredient to benzene hexachloride, $C_6H_6Cl_6$, in hydrocarbons derived from petroleum. After saturation of the $C_6H_6Cl_6$ with hydrocarbons and the crystallization thereof, the solid product is recovered as a solid mass consisting of a mixture of the alpha, beta, delta and gamma isomers.

Having accomplished this first phase, the terpene activating ingredient is prepared starting from the essence of turpentine or pine resin, whose density has a value between 0.856 and 0.870.

The essence of turpentine is treated with $H_2SO_4$, adding this acid gradually whilst stirring continually until it is entirely incorporated in the liquid mass. The percentage of $H_2SO_4$ may be varied during this operation; however, an addition of three to eight percent is considered sufficient. This treatment is carried out by taking the necessary precautions to prevent spattering and other accidents.

Upon completing this treatment, the resultant tars are decanted, neutralizing the obtained liquid with alkalis, when a noticeable acid reaction is observed, and thereafter collecting the produced terpene ingredient, which exhibits a strong colour and a very aromatic smell. The terpenes referred to herein, and as applied in this invention, are in particular, such as are contained in the essence of turpentine.

The terpene ingredient is now incorporated in the $C_6H_6Cl_6$, after being submitted to the aforementioned treatment. The mixture is stirred for a period of several hours, the excess of liquid is removed by filtration or by a centrifugal means, and there is thus recovered a solid, crystallized and moist mixture having a terpene aroma, the mixture being deprived of its original musty smell. Upon exposing this mixture to the air, a change appears to take place which serves to effect its oxidation by absorption of the atmospheric oxygen, thereby producing an intimate union of the terpene ingredient with the alpha, beta, delta, and specially, the gamma isomers of the $C_6H_6Cl_6$. After exposure to atmospheric oxygen the mixture is combined with a suitable inert solid substance to produce an insecticide in powdered form.

The production of an activated insecticidal mixture may provide a product in the liquid state, by saturating the solid active compound in terpene hydrocarbons of the formula $C_{10}H_{16}$, and separating by filtration the insoluble isomer residues, and thereafter recovering a liquid concentrate, which contains the activating ingredient terpenes, $C_{10}H_{16}$, and is saturated mostly with the gamma isomer and small proportions of the remaining isomers of the $C_6H_6Cl_6$. This active compound in its liquid state may be added to appropriate solvents such as petroleum, alcohol, Vaseline, lanolin, linseed oil, etc., for preparing liquid insecticides.

Hereinafter the scope of the invention is illustrated by means of nonlimitative examples for the elaboration of solid and liquid insecticides with this compound.

*Example 1*

25 parts of the solid active mixture obtained by the above described treatment of benzene hexachloride with sulfuric acid treated essence of turpentine are mixed with 1000 of talc, which are homogenized in a closed drum for ½ hour, thus affording maximum dispersion. The finished product is used to destroy agricultural plagues.

*Example 2*

150 parts of the solid active mixture obtained by the above described treatment of benzene hexachloride with sulfuric acid treated essence of turpentine are mixed with 1000 of talc, dispersing same intimately in a closed drum for a ½ hour, obtaining an insecticide powder applicable to cattle for the destruction of lice, tick and acarus, i. e. the producers of mange.

*Example 3*

30 parts of the solid active mixture obtained by the above described treatment of benzene hexachloride with sulfuric acid treated essence of turpentine are added to 1000 of white earth and 30 of vegetable glue, mixing same intimately for a ½ hour, thus obtaining an insecticide pigment applicable in the preparation of an adhesive and persistent insecticide water paint.

*Example 4*

60 parts of the liquid active mixture obtained by the above described treatment of benzene hexachloride with sulfuric acid treated essence of turpentine are added to 1000 of petroleum, obtaining an insecticide spray. When substituting the petroleum by linseed oil, an insecticide oil for paints, is obtainable.

*Example 5*

40 parts of the liquid active mixture obtained by the above described treatment of benzene hexachloride with sulfuric acid treated essence of turpentine are incorporated in 1000 of absolute alcohol, thus obtaining a powerful parasiticide for humans against lice and their nits.

Example 6

30 parts of the liquid active mixture obtained by the above described treatment of benzene hexachloride with sulfuric acid treated essence of turpentine are added to 1000 of Vaseline or lanolin oil, producing a liquid insecticide of immediate effect against human parasites (lice and their nits).

Example 7

60 parts of the liquid active mixture obtained by the above described treatment of benzene hexachloride with sulfuric acid treated essence of turpentine are added to 1000 of pure lanolin oil, thus obtaining a very energetic acaricide applicable for the destruction of human itch.

Having now particularly described and ascertained the nature of the invention, it should be stressed that the details of realization of the exposed idea are variable, without dissenting from the essence of the invention.

What we claim is:

1. An insecticidal composition consisting essentially of benzene hexachloride which has been crystallized from petroleum hydrocarbon, then saturated with but not dissolved in terpene hydrocarbon corresponding to the formula $C_{10}H_{16}$, and then exposed to the oxidizing action of atmospheric oxygen, and an insecticide carrier, said terpene hydrocarbon having been obtained by treating essence of turpentine with sulfuric acid, removing tars and impurities, and neutralizing the so-obtained terpene hydrocarbon.

2. An insecticidal composition as claimed in claim 1, wherein said carrier is an inert solid carrier.

3. An insecticidal composition as claimed in claim 1, wherein said carrier is a liquid inert carrier.

References Cited in the file of this patent

UNITED STATES PATENTS

| | | |
|---|---|---|
| 2,356,980 | Ridder | Aug. 29, 1944 |
| 2,438,900 | Cooke et al. | Apr. 6, 1948 |

FOREIGN PATENTS

| | | |
|---|---|---|
| 578,206 | Great Britain | June 19, 1946 |
| 198,411 | Spain | June 19, 1951 |

OTHER REFERENCES

Brown: Insect Control by Chemicals, John Wiley and Sons, New York, 1951, pp. 154–156.

United States Department of Agriculture Bulletin No. 898, "Turpentine," 1921, pp. 5, 6, and 47.

Simonsen: The Terpenes, volume I, pp. 174 and 175 (1947), Cambridge University Press, Cambridge, England.

Frear: A Catalogue of Insecticides and Fungicides, vol. 1 (1947), p. 166.